(No Model.) 7 Sheets—Sheet 4.

H. J. HAIGHT.
ELECTRO MAGNETIC THERMOSCOPE.

No. 362,957. Patented May 17, 1887.

Witnesses
Norris A. Clark
A. S. Browne

Inventor
Henry J. Haight,
By his Attorney, J. S. Brown.

(No Model.) 7 Sheets—Sheet 6.
H. J. HAIGHT.
ELECTRO MAGNETIC THERMOSCOPE.

No. 362,957. Patented May 17, 1887.

Witnesses
Norris A. Clark
A. S. Browne

Inventor,
Henry J. Haight,
By his Attorney, J. S. Brown.

(No Model.) 7 Sheets—Sheet 7.
H. J. HAIGHT.
ELECTRO MAGNETIC THERMOSCOPE.

No. 362,957. Patented May 17, 1887.

Witnesses　　　　　　　　　　　　　　　Inventor,
　　　　　　　　　　　　　　　　　　　　Henry J. Haight,
　　　　　　　　　　　　By his Attorney

UNITED STATES PATENT OFFICE.

HENRY JANSEN HAIGHT, OF NEW YORK, N. Y.

ELECTRO-MAGNETIC THERMOSCOPE.

SPECIFICATION forming part of Letters Patent No. 362,957, dated May 17, 1887.

Application filed April 27, 1886. Serial No. 200,458. (No model.)

*To all whom it may concern:*

Be it known that I, HENRY JANSEN HAIGHT, a citizen of the United States, residing in the city, county, and State of New York, have invented an Improved Electro-Magnetic Thermoscope; and I do hereby declare that the following is a full and exact description of the same, reference being had to the accompanying drawings, making part of this specification.

My present invention is based upon the principles of the electro-magnetic thermoscope patented to me on the 4th day of November, 1884, No. 307,543; and I use or may use the receiving-thermoscope therein described without change, the improvements hereinafter set forth belonging to the local and electrically-transmitting thermoscope, as set forth in that patent. I also use or may use in connection with the present invention a distant alarm or signal-sounding device electrically operated by means, for instance, substantially as set forth in my application for Letters Patent filed June 17, 1885, Serial No. 168,957; and I have shown in the accompanying drawings the means for forming the electrical connection between such receiving-thermoscope and signal-sounding device with the local and transmitting thermoscope, which is the subject of the present invention.

My invention herein set forth consists in specific improvements, which will be defined in the specification and claims following.

In the drawings, Fig. 6, a horizontal axial section of the upper part or head of the instrument.

Like letters designate corresponding parts in all of the figures.

One of the purposes of the present invention is to construct the thermoscope for use out of doors as well as inside of buildings, and hence, to properly inclose and shield the operative parts from the elements; and another desideratum in its construction is to mount the thermoscope so as to be conveniently inspected for taking observations from different points of approach, according to its situation.

For fulfillment of these two special purposes, the case of the thermoscope is made in two parts or with two compartments, A B, the lower part, A, being preferably a cylinder arranged in a vertical position, and the upper part, B, being also preferably a cylinder arranged in a horizontal position, the upper case being centrally attached to the upper end of the lower case, and the two having the general form in side view of the letter T. In the lower compartment, A, is located the thermostatic coil C, exposed to the outer air through the open lower end, a, of the case, to render its action sensitive and sufficiently quick on a change of atmospheric temperature. In the upper compartment, B, are located the operative parts or movement of the local and electrical transmitting-thermoscope; and this upper compartment is separated from the lower compartment, A, by a solid and close partition, D, whereby the circulation of the outer air and dampness are practically excluded from the upper compartment.

For convenience of observing the indications of the thermoscope from different positions or directions, the whole case of the thermoscope is pivoted to its support, so as to at least turn partly round on a vertical axis. This is effected, as represented, by means of a ring-bearing, E, attached to and projecting from a suitable support or mounting-board, F, the said ring-bearing being large enough to receive the entire shouldered lower end of the lower compartment-case, A, as a journal, below a shoulder, b, thereon, and the additional means of a pivot, c, projecting centrally upward from the top of the whole case, and turning in a bracket-bearing, d, attached to and projecting from the said support or mounting-board. The shouldered end of the case A ordinarily forms a cap screwed upon the lower end of the main case, by the removal of which better access is obtained to the interior of the said case and the thermostatic coil C therein.

The upper end of the cylindrical lower compartment-case is screw-threaded, whereby it is screwed into the lower end of a cylindrical flange, e, on the lower side of the upper compartment-case, thereby uniting the two cases. By means of this connection between the two compartment-cases the partition D is best secured in place, it being clamped between the upper end of the lower case and a shoulder, f, on the inner surface of the connecting-flange. This partition is, nevertheless, insulated from the said case and connecting-flange by covering its upper and lower surfaces and edge with gutta-percha or other insulating material, as indicated by heavy black lines around the same. This forms part of the general insulation of the several parts of the thermoscope from the case, whereby the electric transmitting-currents are conveyed along the said parts, as hereinafter set forth. By this partition-plate the thermostatic coil C is supported, being secured first to a flange-head, G, by a screw or screws, g; and this flange-head is secured by bolts h h to the said partition. The coil projects downward in or near the middle of the compartment A, reaching nearly to the lower end thereof, with free space around it. The coil has the special form of a spiral, composing a cylindrical tube, so that the expansion and contraction of the coil by heat and cold may cause its lower free end to turn in the arc of a circle, and thereby cause a spindle, H, coupled to its lower end, to turn on its axis. It is by this spindle that the expanding and contracting movement of the coil is communicated to the indexes of the local thermoscope above, and the electrical circuits of the transmitting thermoscope and alarm are closed and broken. The connection between the lower end of the coil and the lower end of the spindle is made by means of a segment-coupler, i, screwed or bolted to the coil, and having a square or angular socket to receive the lower end of the spindle of similar form, so that the spindle will turn therewith. The coupler, covering only a segment of a circle, does not injuriously stop the opening to the interior of the coil. In order to prevent the free circulation of air around the spindle up into the compartment B, another similar tube, I, surrounds the spindle inside of the tubular coil, being secured to the partition D at its upper end, and having a close head at its lower end fitting closely but not tightly around the lower end of the spindle and forming a bearing therefor. Thus a free open space is left inside of the coil, exposing both its interior and exterior surfaces to the air from without, while practically the outside air is excluded from the compartment B.

Figure 13:
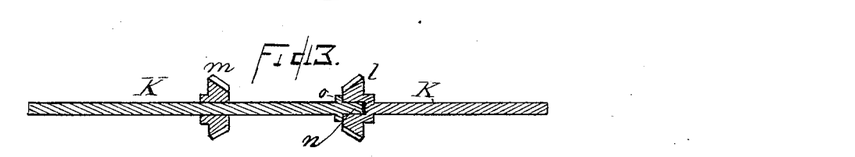
Fig. 13, a central longitudinal section of the divided index-shaft and pinions mounted thereon.

The upper end of the spindle H has its bearing in a standard, J, secured at its foot to the upper side of the partition D, having a shoulder, j, above the bearing to support the spindle in position. Upon the upper end of this spindle is a gear-wheel, k, which gears into the opposite gear-wheels, l m, at opposite sides thereof, and respectively upon two parts of a divided shaft, K, which carries or is the axis of the principal movable parts of the instrument. The gear-wheels k l m may be a bevel cog-wheel and bevel-pinions, as shown, or the gear-wheel on the spindle H may be a crown-wheel, gearing into leaf-pinions on the shaft K, or vice versa, or any other suitable kind of gearing may be used. The two parts of the shaft K are coupled together between the two pinions l m, as shown, the pinion on one part of the shaft serving as a socket for the end n of that part of the shaft, as shown in Fig. 13, there being a shoulder, o, on the said shaft back of the coupling end to prevent the same from being inserted too far in the coupling-socket. One part of the shaft turns freely in the coupling-socket of the other part, so that the two parts turn in opposite directions when the driving-spindle turns. The front part of the shaft is movable endwise, so that it can be drawn forward far enough to throw its pinion l out of gear with the gear-wheel k on the spindle H, and the main index L of the local thermoscope be moved for adjustment or other purpose without disturbing the coil or any other part of the movement. A spring, p, on this part of the shaft pushes it backward to automatically engage the shaft-pinion with the gear-wheel of the spindle when the said shaft is let go. This forward part of the shaft K, receiving motion from the thermostatic coil through its spindle, serves to transmit the movements from the variations of temperature to the said main index L, moving in front of a suitable thermoscopic dial, M, in the front chamber of the compartment B, which chamber is covered by a glass plate, q. The operation of this main index and of the increasing and decreasing temperature indexes N O, in connection with the dial and the thermostatic coil, is substantially the same as set forth in the former Letters Patent issued to me November 4, 1884, above referred to.

Figure 5:
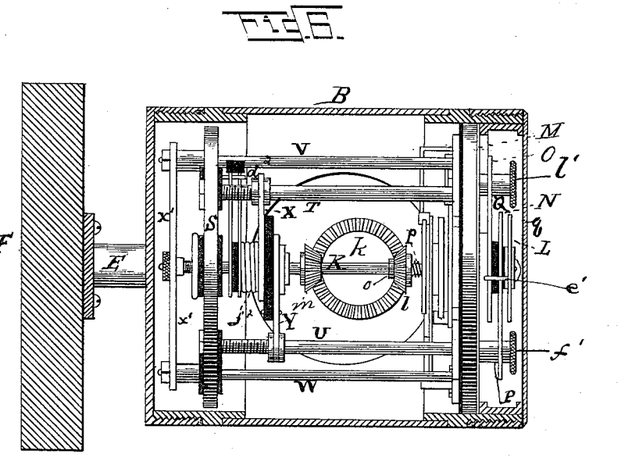
Fig. 5, an axial vertical section of the same.

The shaft K is insulated from the other parts of the instrument by a tubular insulator, r, as shown in Fig. 5, of india-rubber or other insulating material; and the main index itself is also insulated by an insulating-disk, s, forming a head or flange of the said tubular insulator. Around the said tubular insulator is a metallic tube, t, which forms a bearing or journal for one of the temperature-limiting indexes—say the increasing-temperature index N—as shown in the drawings. Around this tubular bearing is another insulating-tube, $u$, around which is another tubular bearing, $v$, for the other limiting-index or the decreasing-temperature index O, and thus all the indexes are insulated. A knob, $w$, on the front end of the forward part of the shaft K serves for drawing the same forward, and this knob may serve as a cap to attach the main index L thereto, as shown, there being a counter cap or washer behind the index to clamp it against.

Figure 7:
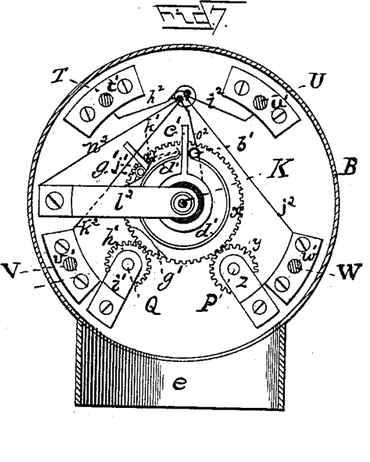
Fig. 7, a transverse vertical section of the head of the thermoscope in a plane indicated by the line 7 7, Figs. 3 and 5.
Figure 8:
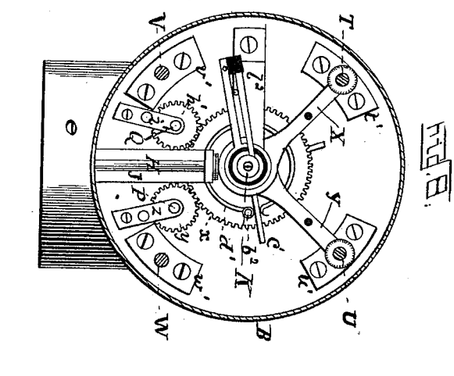
Fig. 8, a similar section in a plane indicated by the line 8 8, Figs. 3 and 5.
Figure 9:
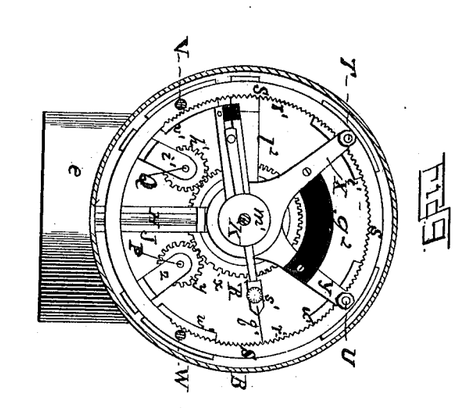
Fig. 9, a similar section in a plane indicated by the line 9 9, Figs. 3 and 5.
Figure 10:
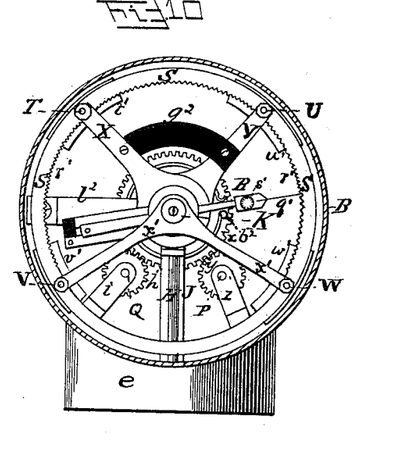
Fig. 10, a similar section in a plane indicated by the line 10 10, Figs. 3 and 5.

For the purpose of adjusting the temperature-limit indexes N O without disturbing the main index L and its shaft, a peculiar device is employed, as follows: The tubular bearing $t$ of the increasing-temperature index N has a gear-wheel, $x$, loose thereon, into which another gear-wheel, $y$, matches, the said gear-wheel $y$ being secured upon a shaft or spindle, P, Figs. 5 and 6, having a bearing in the face-plate of the tube B, but insulated therefrom, and in a bracket, $z$, secured to and projecting backward from the said face-plate and insulated therefrom. This shaft has on its outer end a milled head or knob, $a'$, which projects forward into the index chamber of the case. The gear-wheel $x$ is coupled to the tubular bearing $t$ of the index N by means of a pin, $b'$, projecting backward therefrom and engaging with a radial arm, $c'$, on the inner end of the said tubular bearing. As the gear-wheel is turned forward, it moves the said arm, and thus moves forward the index to any degree to which it is required to be set. A very light spring, $d'$, Figs. 7 and 8, is attached to the gear-wheel and bears against the rear side of the said radial arm, thus ordinarily holding the said arm in contact with the pin $b'$, so that when the gear wheel is turned backward the spring will cause the index to follow it as well as if it were coupled separately to the said gear-wheel; but the purpose of this spring-connection is that when the index N is reached by the main index, or its contact-pin $e'$, to sound an alarm, the said index L may still move on to a higher degree and carry along the stationary index N temporarily with it; but when the main index again recedes within the limit of the said index N that latter index may be brought back to its normal position by the said spring. A tightening-screw, $f'$, is used to hold the adjusting-shaft P against any displacement of the index N. A precisely-similar construction, located on the other side of the central shaft, is employed for adjusting the decreasing-temperature-limit index O. The parts as represented are the gear-wheel $g'$, loose on the tubular bearing $u$ of the index O, gearing into another gear-wheel, $h'$, on an adjusting shaft, Q, Figs. 6, 7, 8, 9, 10, turning in a bracket-bearing, $i'$, and both insulated from the face plate; a pin, $j'$, projecting from the gear-wheel $g'$, engaging with a radial arm, $r^2$, Fig. 5, on the rear end of the tubular-bearing of the said index O; also, a light spring, $k'$, Fig. 7, on the said gear-wheel bearing against the rear side of the said radial arm for the same purpose as before described for the corresponding arm of the index N. The shaft Q is also tightened in place by a tightening screw, $l'$, Fig. 6.

The electric transmitting device for distant temperature-indications is constructed as follows: The rear part of the shaft K, turned by the gear-wheel $k$, on the coil-spindle H, engaging with the pinion $m$, on the said rear part of the shaft, is the moving power of this device. This shaft carries a circuit-closer, R, mounted thereon near its rear end, but insulated therefrom by non-conducting clamp-disks $m'$ $n'$, held between a flange, $o'$, Fig. 5, on the shaft, and a screw-nut, $p'$, or by an equivalent means. The thin flexible contact-strip $q'$ of the circuit-closer comes in contact with the serrated projections $r'$ on the inner periphery of a ring-sector, S, the several serrations or teeth being at intervals of a degree of temperature each, according to the graduations of the scale of the instrument. This sector-ring, of course, is concentric with the axis of the circuit-closer, so that the contact-strip will touch all the serrations equally. The contact-strip is secured and adjustable by a set-screw, as shown, or other suitable means, in a holding-block, $s'$, on the end of the circuit-closer arm, so that the contact with the teeth of the ring-sector may be made as light and yet as sure as possible. The ring-sector is held in place within the case and kept insulated therefrom by means of four parallel horizontal rods, T U V W, which are secured at their forward ends to the face or dial plate M by flanges $t'$ $u'$ $v'$ $w'$, respectively screwed to the plate, but insulated therefrom. The rear ends of these rods pass through the ring-sector and are secured thereto by screws or bolts, and insulated therefrom by insulating washers or tubes, except one rod, W, which is in metallic connection therewith for the purpose of connecting the ring-sector electrically with the battery-wire of the electrical circuits. Two of these rods, V W, support also the rear end of the rear part of the shaft K by means of a two-armed bearing, $x'$, the extremities of the two arms being tubular to pass around said rods, and being held by nuts and insulated by insulating plates or washers from the ring-sector. The bearing $z'$ itself is or may be adjusted on the shaft to determine the exact longitudinal position of the latter. Upon the respective upper horizontal rods, T U, are two suspending arms, X Y, having, respectively, concentric tubular bearings $y'$ $z'$, surrounding the shaft K, but not in contact therewith, and insulated from each other by an insulating-tube, $a^2$, between them. On the respective bearings $y'$ $z'$ are contact-rods $b^2$ $c^2$, projecting radially outward parallel with and quite close to each other, but leaving sufficient space between them for the admission of a contact-pin, $d^2$, projecting laterally forward from the circuit-closer R, so that the said contact-pin cannot be in contact with both rods at the same moment, but may have to move as small a distance as practicable in changing from one rod to the other. The outer ends of the two contact-rods are coupled together by an insulating-block, $e^2$, which keeps them in exact and proper relation to each other. A brake-spring, $f^2$, surrounds the outer tubular bearing, $y'$, pressing lightly between it and a flange on the bearing to hold the contact-rods $f^2 c^2$ securely in whatever position they are moved to. The two arms X and Y are insulated from each other by an insulating-plate, $g^2$. One arm, X, by its suspending-rod T, is electrically connected with the temperature-increasing wire $h^2$ of the transmitting-circuits, and the other arm, Y, by its suspending-rod U, is electrically connected with the temperature-decreasing wire $i^2$ of the transmitting-circuits; and, as above set forth, the ring-sector S, by the rod W, is electrically connected with the battery or return wire $j^2$ of both circuits. Thus when the shaft K is turned by the thermostatic coil in one direction, the contact-rod $b^2$ is brought into contact with the contact-pin $d^2$ of the circuit-closer, and the increasing-temperature circuit is closed whenever the contact-strip $q'$ comes in contact with a tooth on the ring-sector, thus marking one degree of increasing temperature, and when the shaft is turned by the thermostatic coil in the other direction the contact-rod $c^2$ is brought into contact with the pin $d^2$ of the circuit-closer, and the decreasing-temperature circuit is closed whenever the said contact-strip comes in contact with a tooth on the ring-sector, marking one degree of decreasing temperature.

It is convenient to have the three wires $h^2$ $i^2$ $j^2$, Figs. 1, 3, 5, 7, and 11, increasing-temperature, decreasing-temperature, and return or battery wires, respectively attached to the rods T U W by their attaching-flanges $t' u' w'$, respectively, and then brought together in a cable leading out of the instrument, as shown in Fig. 7; and the remaining rod V is connected by its flange with the battery or return wire $k^2$ of the alarm-circuits. This rod is in electrical connection with the shaft K, the driving-spindle, and thermostatic coil, all of which are insulated from the case if made of metal and from other parts connected with other circuits of the instruments.

Figure 1:
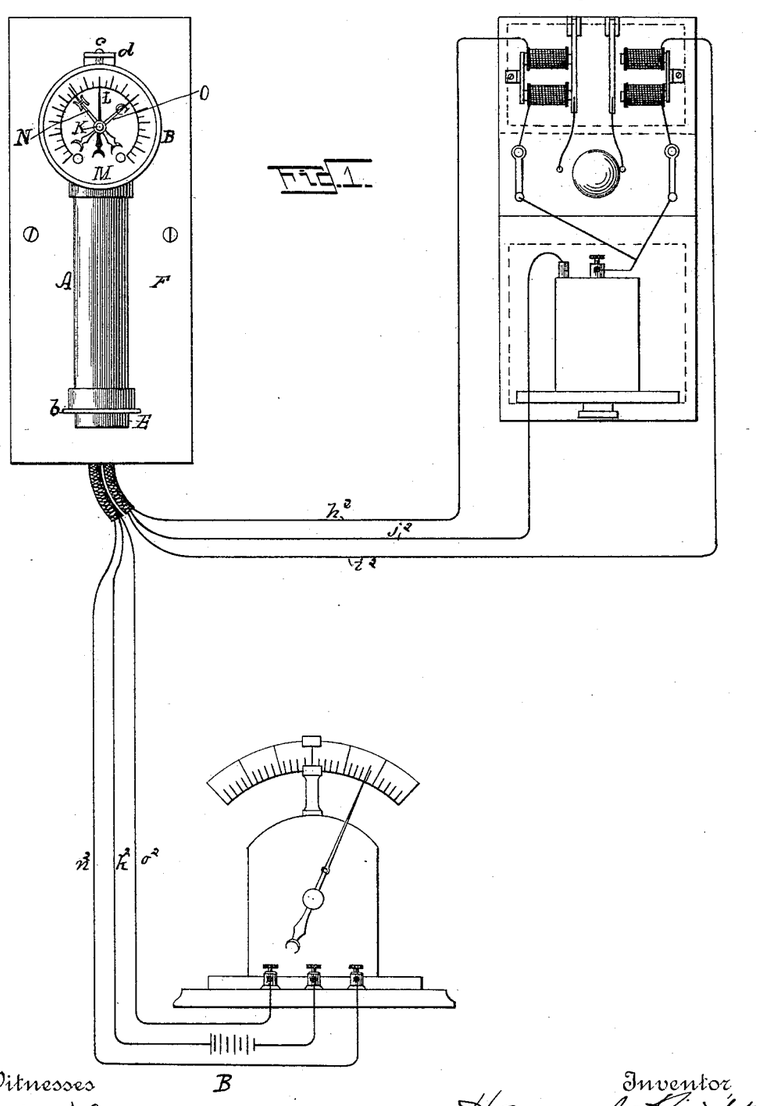
Figure 1 shows in outline, respectively, front views of this improved transmitting thermoscope, a receiving thermoscope, and a sound-signal device, all connected together by suitable wires, composing connecting electric circuits required for the united operation of all the instruments.
Figure 2:
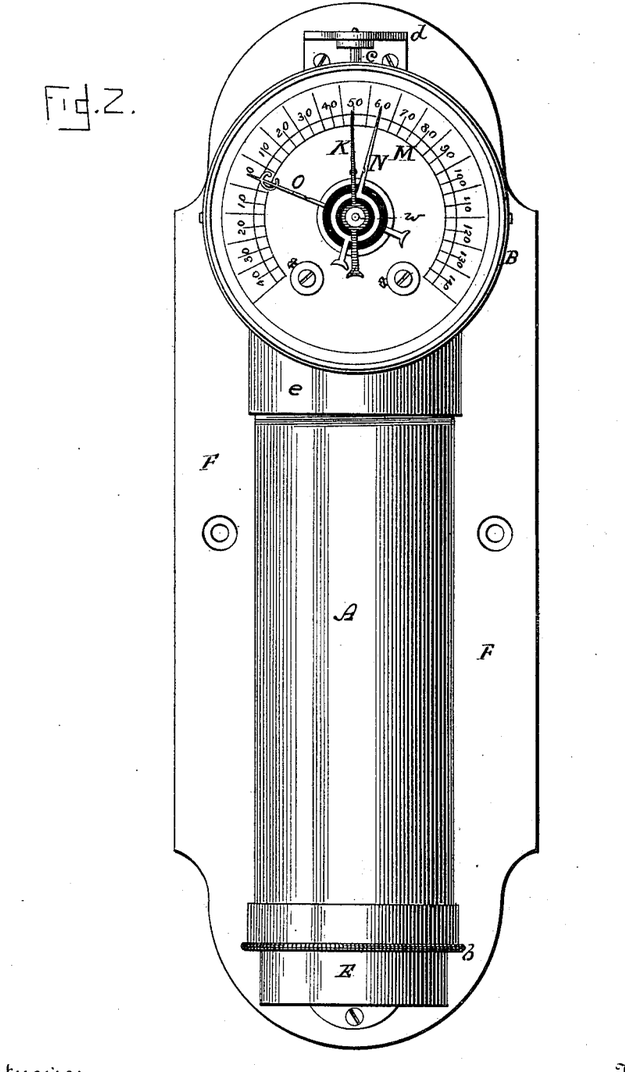
Fig. 2, a front view of the improved local and transmitting thermoscope.
Figure 3:
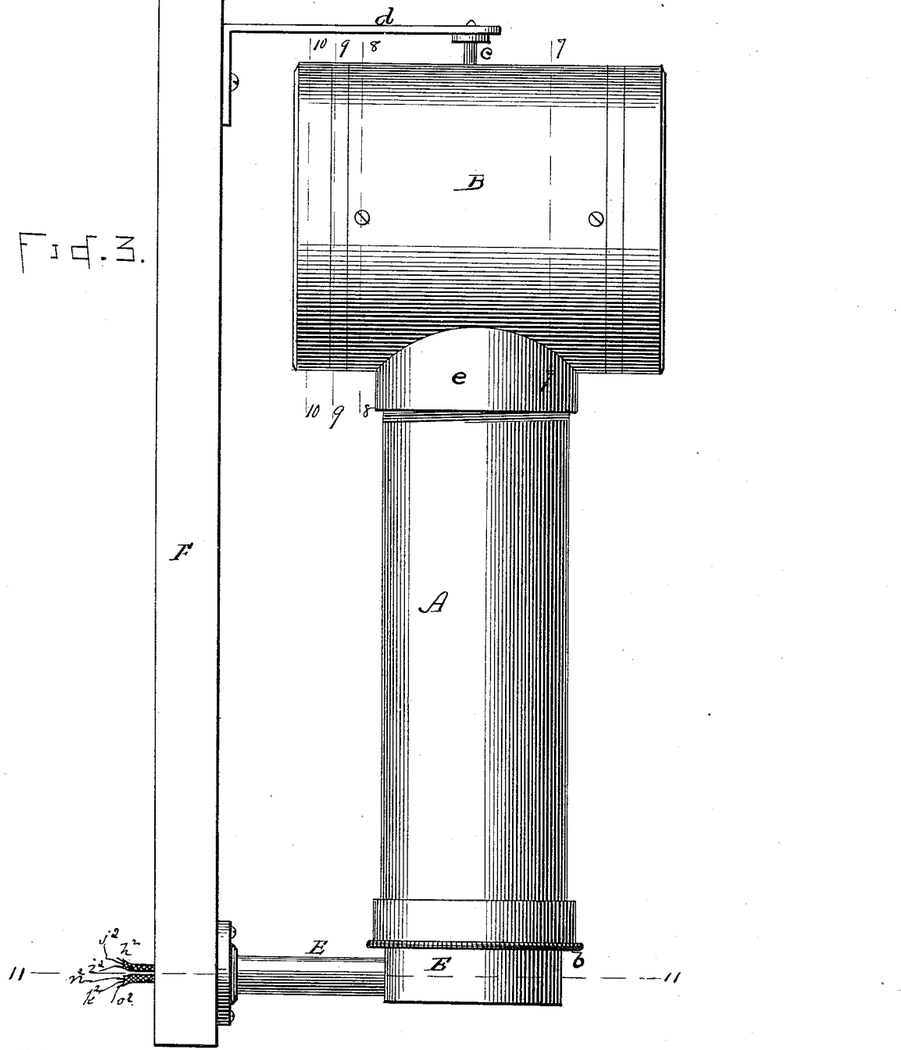
Fig. 3, a side view of the same.
Figure 4:
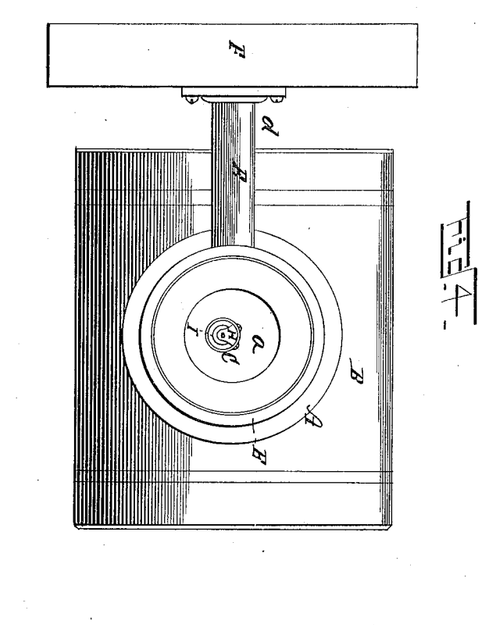
Fig. 4, a view thereof, looking upward from beneath the same.
Figure 11:
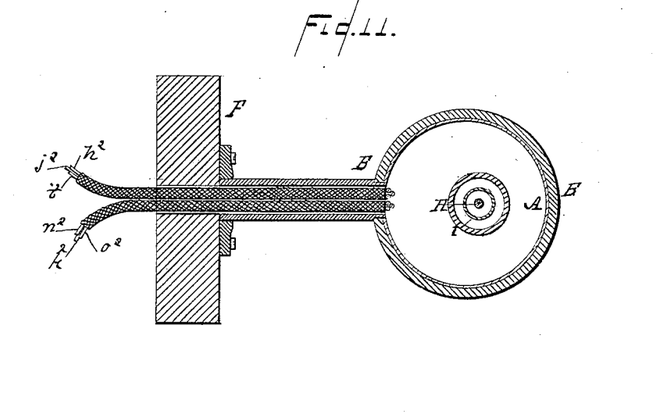
Fig. 11, a transverse horizontal section of the lower part in a plane indicated by the line 11 11, Figs. 3 and 5.
Figure 12:
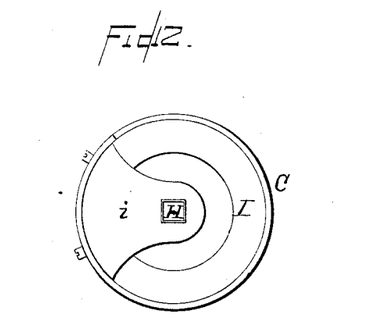
Fig. 12, a view, on an enlarged scale, of the lower end of the thermostatic coil and parts immediately connected therewith.

The increasing-temperature index N is connected with the increasing-temperature-alarm-circuit wire $n^2$ by means of a metallic bridge, $l^2$, Figs. 6, 7, 8, 9, 10, attached to the rear end of its tubular bearing, and the decreasing-temperature index O is connected with the decreasing-temperature-alarm-circuit wire $o^2$ by means of a bridge or flange, $m^2$, Fig. 5, on the rear end of its tubular bearing. The battery-alarm-circuit wire $k^2$, increasing-temperature-alarm-circuit wire $n^2$, and the decreasing-temperature-alarm-circuit wire $o^2$ are also conveniently brought together into a cable, as shown in Figs. 3, 5, 7, and 11, and both of the circuit-cables are extended down from the upper compartment of the instrument, through the partition-plate, into the lower compartment of the instrument, and thence outward through the tubular arm of the ring-bearing E, which supports the instrument, as shown in Figs. 1, 5, and 11; and in order that these cables thus conducted out of the instrument may not interfere with the turning of the instrument in its bearings a peripheral slot, $p^2$, Fig. 5, is cut through the side or journal of the lower tube, A, through which the cables are passed, and is long enough to allow as much turning movement of the instrument as desired.

I claim as my invention—

1. The combination of an electro-magnetic transmitting-thermoscope, an upper pivot-bearing therefor, a lower ring-bearing having a lateral opening in one side, a lower cylindrical journal on the lower end of the thermoscope, and having a laterally-extended peripheral slot therein, and the electric-circuit wires passed through the said opening in the lower bearing and slot in the lower journal, whereby the thermoscope may be turned in the bearings without interfering with the circuit-wires and their connections, substantially as herein specified.

2. The combination of a spiral tubular thermostatic coil, a spindle coupled thereto and situated therein, an interior tube situated within the coil-tube and inclosing the spindle within the said coil-tube, and the upper compartment of the thermoscope communicating with the said spindle-inclosing tube, substantially as and for the purpose herein set forth.

3. The combination of a thermostatic coil, a spindle coupled to the coil, a divided shaft gearing on the spindle and gearing on each part of the shaft and taking into the gearing on the spindle, whereby the two parts of the shaft are turned separately by the spindle and simultaneously in opposite directions.

4. The combination of a thermostatic coil, a spindle coupled thereto, a divided shaft having its two parts separately geared to the spindle, an index on one part of the said shaft, and a circuit-closer on the other part thereof.

5. The combination of the coil, the spindle, a divided shaft gearing upon each part of the shaft and upon the spindle, one part of the shaft having a longitudinal movement for ungearing it from the spindle-gear and again bringing it into gear, and a temperature-index on the said movable part of the shaft, substantially as and for the purpose herein specified.

6. In combination with the shaft carrying the main temperature-index, increasing and decreasing temperature limit indexes having tubular journals around the said shaft, gear-wheels respectively on the journals of the said temperature-limit indexes, and shafts provided, respectively, with gear-wheels gearing into the index gear-wheels, whereby the positions of the said temperature-limit indexes are adjusted, substantially as herein specified.

7. The combination of the main temperature-index, the shaft on which the same is mounted, increasing and decreasing temperature limit indexes provided, respectively, with journals or axes, arms upon said journals or axes, adjusting gear-wheels respectively on the journals or axes of the said temperature-limit indexes, coupling-pins carried by the main temperature-index shaft and striking, respectively, the arms projecting from the said index journals or axes on one side, and springs respectively arranged to hold the said arms in contact with the said coupling-pins, whereby the main index is allowed to move the temperature-limiting indexes beyond the fixed limits, for the purpose specified.

8. The combination of a thermostatic coil, a spindle coupled to the said coil, a shaft geared to the said spindle, a circuit-closer on the said shaft, and a serrated ring-sector concentric with the shaft for completing the circuit with the circuit-closer, substantially as and for the purpose herein specified.

9. The combination of the coil-actuated spindle, a shaft geared to the spindle, a circuit-closer on the shaft, and a serrated ring-sector completing the electrical circuit with the circuit-closer, increasing and decreasing temperature circuit-arms insulated from each other, and circuit-shifting rods respectively on the said arms, and a circuit-shifting pin carried by the said shaft, substantially as herein set forth.

10. The combination of carrying-rods, insulated pins for securing the said rods in the case, a circuit-closing ring-sector sustained by the said rods, and insulated from all but one, with which it is in electrical connection, circuit-shifting arms carried, respectively, by two of the rods, increasing and decreasing temperature circuit-wires connected, respectively, with the arm-supporting rods, and a return circuit or battery wire connected with the ring-sector rod.

11. The combination of the main temperature-index in electric connection with a return circuit or battery wire, the increasing and decreasing temperature-index spindles, bridges or flanges projecting, respectively, from the spindles of the increasing and decreasing temperature indexes, and circuit-wires connected, respectively, with the said bridges or flanges, for the purpose specified.

12. In an electro-magnetic transmitting and signal thermoscope, the combination of the main index, increasing and decreasing temperature-limit indexes, circuit-wires respectively connected electrically with the said indexes, a circuit-closing sector, and a circuit-closer, two circuit-shifting arms and circuit-wires respectively connected electrically with the said circuit closer and circuit-shifting arms, substantially as and for the purpose herein specified.

HENRY JANSEN HAIGHT.

Witnesses:
C. S. NEWELL,
M. E. HAIGHT.